United States Patent [19]

Daniels

[11] Patent Number: 5,050,571
[45] Date of Patent: Sep. 24, 1991

[54] DIESEL FUEL CONVERSION MEANS FOR SPARK-IGNITION ENGINES

[76] Inventor: Constantin Daniels, 47-07 41 St., Apt. 3-H, Sunnyside, N.Y. 11104

[21] Appl. No.: 468,016

[22] Filed: Feb. 26, 1990

[51] Int. Cl.[5] .............................. F02M 31/00
[52] U.S. Cl. .................... 123/557; 123/152; 123/546; 123/556
[58] Field of Search ............... 123/546, 556, 557, 3, 123/152, 590; 60/321

[56] References Cited

U.S. PATENT DOCUMENTS

| | | | |
|---|---|---|---|
| 1,269,753 | 6/1918 | Shum | 123/546 |
| 1,793,554 | 2/1931 | Moore | 123/556 |
| 3,461,850 | 8/1969 | Oblander | 123/556 |
| 4,111,178 | 9/1978 | Casey | 123/152 |
| 4,176,165 | 9/1979 | Finlay et al. | 123/546 |
| 4,220,120 | 9/1980 | Jackson et al. | 123/3 |
| 4,703,741 | 11/1987 | Curran et al. | 123/557 |
| 4,768,481 | 9/1988 | Wood | 123/556 |

Primary Examiner—Andrew M. Dolinar
Assistant Examiner—M. Macy
Attorney, Agent, or Firm—Robert S. Stoll

[57] ABSTRACT

The purpose of this patent is to permit the use of diesel fuel for spark-ignition engines, whatever the type, e.g. two- or four-stroke piston engines (Rochas-Otto cycle); rotary (all types, including Wankel) by spraying diesel fuel onto a hot exhaust manifold to vaporize the fuel within an intake manifold.

6 Claims, 2 Drawing Sheets

SECTION A-A

SECTION A-A

SECTION B-B

SECTION C-C

DIESEL FUEL CONVERSION MEANS FOR SPARK-IGNITION ENGINES

OTHER PUBLICATIONS

Professor C. Arama—Course: Internal Combustion Engines Polytechnic Institute of Bucharest (Romania) 1947.
*Automotive Engineering*, January 1990, SAE.
Bosch *Automotive Handbook*.
Mark's *Standard Handbook for Mechanical Engineers*.
Newton, Steeds & Garrett *The Motor Vehicles*.

BACKGROUND OF THE INVENTION

The fact that at the same compression ratio, the output of spark ignition (hereinafter sometimes referred to as "S.I.") engines is higher than the output of diesel engines.

The Appendix shows the demonstration of this theorem by Professor C. Arama at the Polytechnic Institute of Bucharest in 1947.

SUMMARY OF THE INVENTION

This invention combines the functional principles of spark-ignition and diesel engines. It uses diesel fuel and diesel compression ratio in an S.I. engine (Rochas-Otto cycle). The diesel fuel is sprayed onto the exhaust manifold which is hot enough to vaporize the fuel, and which runs within the intake manifold, so that the vaporized fuel and air flow into the combustion chamber.

The aims of this combination are:

A higher output achieved through increased compression ratios: from 6 to 12 in existing S.I. engines; to 17.5 to 21 in Diesel engines.

Diesel fuel contains 13% more energy than gasoline.

The optimum recuperation of heat loss in the exhaust system. Because of this saving, this engine can be considered a synergism.

Reduced pollution: Diesel fuel emits less pollution than gasoline.

Faster pick-up than diesel.

POSITION 1 is the intake manifold.

POSITION 2, the exhaust manifold, is placed inside.

POSITION 3 shows the injectors placed in line with the intake air tubes, one above and the other below the central axis of the manifold.

POSITION 4 is the starting flame glow plug, one for each cylinder.

Figure 2:
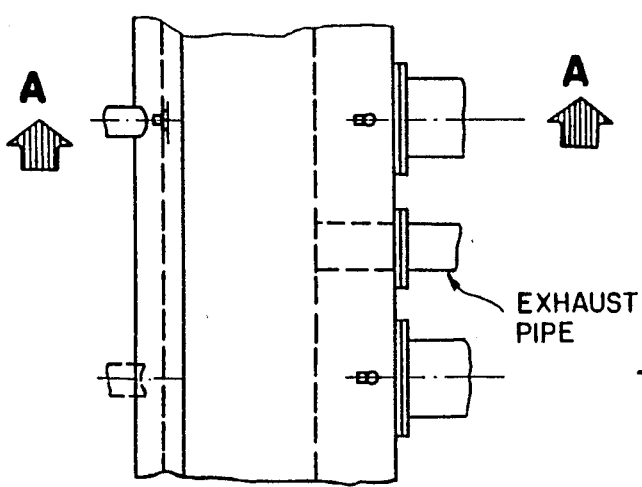

FIG. 2 is Section B—B. It shows the connection of exhaust tubes to the exhaust manifold and the starting glow plugs.

Figure 3:
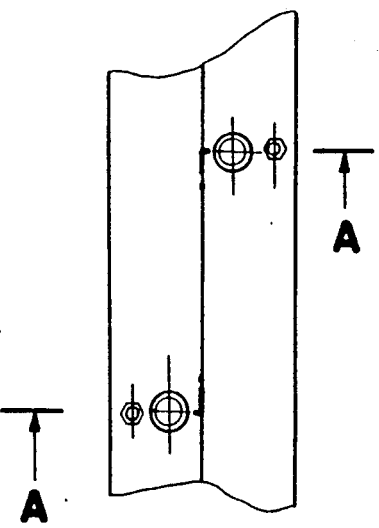

FIG. 3 shows the alternate position of intake tubes and injectors for adjacent cylinders.

Figure 4:
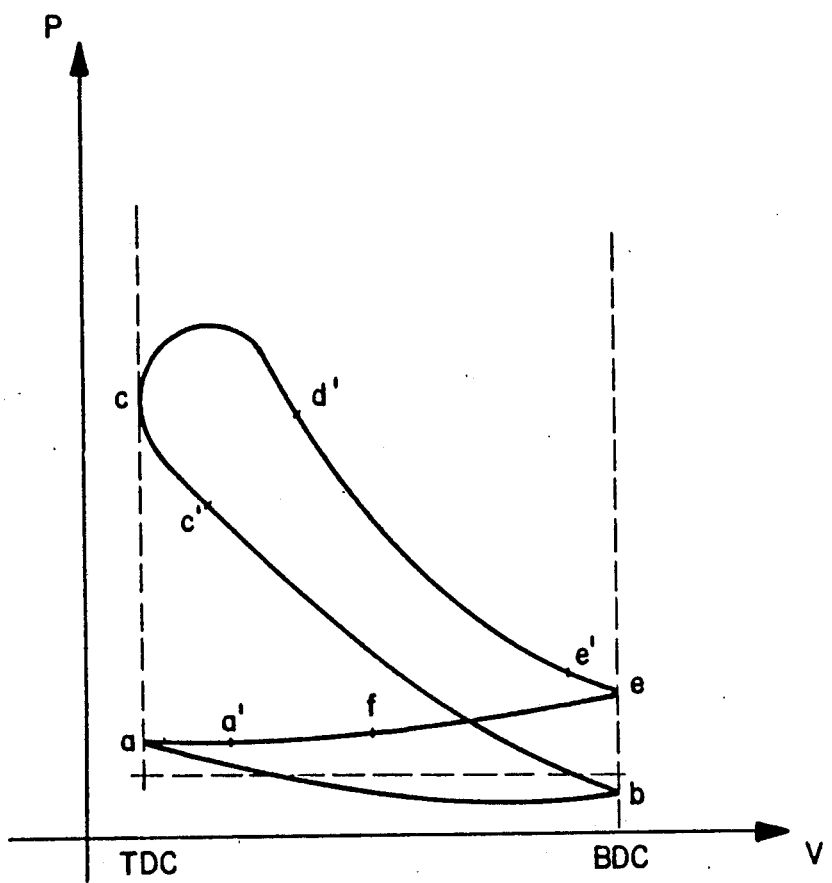

FIG. 4 is the P.V. diagram for S.I. engines (Rochas-Otto cycle). It is included only to specify the injection time, Point f. The diagram plots pressure ("P") on the vertical axis and cylinder volume ("V") on the horizontal axis. In FIG. 4, the points have the following meaning:

a-b Suction Stroke-Admission of Charge
a' Intake Valve Opens
b-c Compression Stroke
c' Ignition
c'-d' Progressive Burning
e' Exhaust Valve Opens
f Injection
e-a Exhaust Stroke.

DETAILED DESCRIPTION OF THE INVENTION

Figure 1:
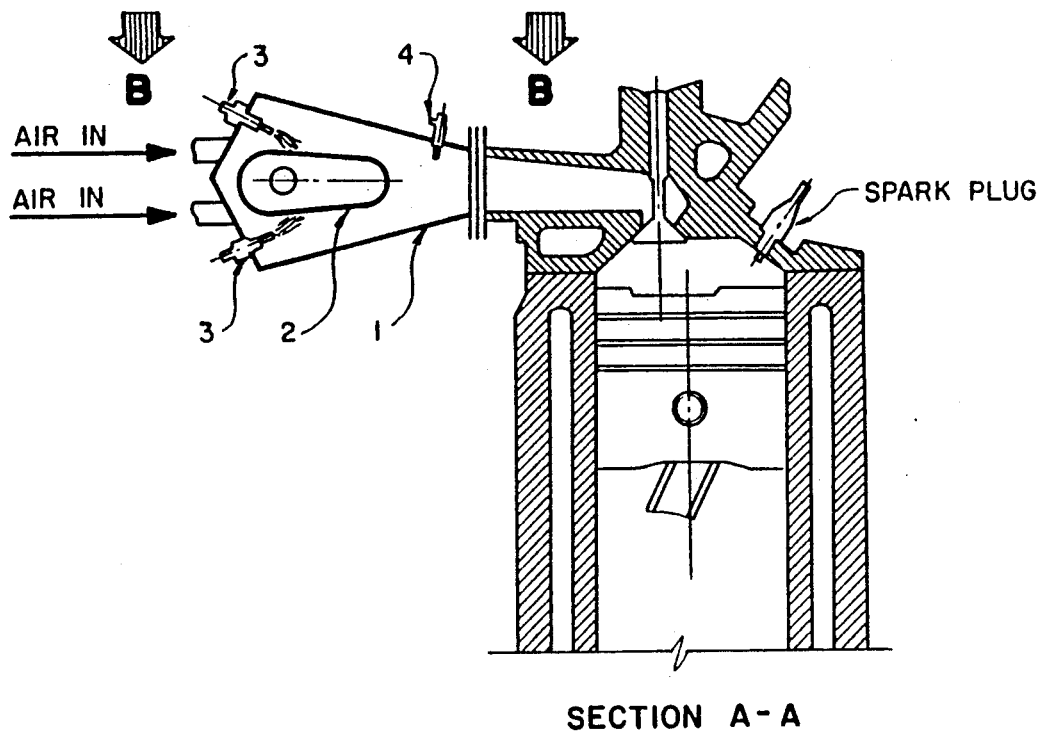
FIG. 1 represents Section A—A of a regular S.I. engine where Parts 1 to 4 are applied.

The embodiment of the 4 positions, as shown in FIG. 1, creates the system that combines S.I. and Diesel principles.

The start-at-cold is assured by a flame glow plug (Position 4, FIG. 1). It can be Bosch type or similar—one for each cylinder. As soon as the temperature of the exhaust manifold reaches the boiling point of Diesel fuel @ 250° C.*, the flame glow plugs are disconnected and engine function is assured by the injectors (Position 3, FIG. 1).

\* The boiling point for diesel fuel, 180° to 360° C.

The exhaust manifold is located inside the intake manifold and connected by exhaust pipes, as shown in FIG. 2.

The injectors spray the diesel fuel under pressure of 70 to 110 Bar over the exhaust manifold. The result is a vapor of diesel fuel. The engine functions with the resultant mixture of diesel fuel vapor and inlet air at the compression ratio 17.5 to 21.

In P.V. diagram (FIG. 4), the time of injection is indicated by Point f. Point f is located in this diagram after e' to allow the transfer of heat exhaust to the manifold surface, and is located before a' so that the sprayed fuel has time to vaporize before the inlet valve opens.

The reason for locating injectors above and below the central axis of manifolds is to capture the heat from both faces of the exhaust manifold.

After one injector sprays its designated surface, the surface cools. The surface heat is restored when other injectors operate.

In the preferred embodiment, fuel injectors 3 are staggered longitudinally and on opposite sides of the axis of the manifolds, as shown in FIGS. 2 and 3. This does not necessarily exclude embodiments in which, for example, injectors are located on opposite sides of the manifold at the same cylinder location, as shown in FIG. 1, but may be fired alternately so that both faces of the exhaust manifold are not cooled simultaneously.

The profile of the exhaust manifold that narrows towards the inlet port ensures the necessary turbulence to homogenize the mixture.

APPENDIX

THEORETICAL DEMONSTRATION

THEOREM: At the same compression ratio, the output of the S.I. engine (Rochas-Otto cycle) is higher than the Diesel output.

The indicated theoretical thermal output for the S.I. engine (Rochas-Otto):

$$\eta_{RO} = 1 - \frac{1}{R_c^{\kappa-1}} \quad (1)$$

where:

$R_c$: Volumetric compression ratio
$\kappa = 1.4$ Polytropic coefficient for S.I. and Diesel engines For the Diesel engine, the indicated theoretical thermal output is:

$$\eta_D = 1 - \frac{1}{\kappa R_c^{\kappa-1}} \frac{R_d^\kappa - 1}{R_d - 1} \quad (2)$$

where:

$R_c$: Volumetric compression ratio
$R_d=2$: Injection ratio (Volumetric expansion ratio during the constant pressure combustion).

OBJECT OF DEMONSTRATION

At the same $R_c$ $$\eta_D < \eta_{RO} \quad \text{namely} \quad (3)$$

$$1 - \frac{1}{\kappa R_c^{\kappa-1}} \frac{R_d^\kappa - 1}{R_d - 1} < 1 - \frac{1}{R_c^{\kappa-1}} \quad (4)$$

We substitute:

$$\frac{1}{\kappa R^{\kappa-1}} \frac{R_d^\kappa - 1}{R_d - 1} = \alpha \; \& \; \frac{1}{R_c^{\kappa-1}} = \beta \quad (5)$$

We obtain:

$$1 - \alpha < 1 - \beta \quad (6)$$

We have to demonstrate that $$\alpha > \beta \quad (7)$$

That means $$\alpha/\beta > 1.$$

From (4) we obtain $$\alpha = \beta \left( \frac{1}{\kappa} \frac{R_d^\kappa - 1}{R_d - 1} \right)$$

Hence $\frac{1}{\kappa} \frac{R_d^\kappa - 1}{R_d - 1} > 1$ than $$R_d^\kappa - 1 > \kappa(R_d - 1) \quad \text{or} \quad (8)$$

$$R_d^\kappa > 1 + \kappa(R_d - 1) \quad (9)$$

Substituting $$R_d - 1 = h \rightarrow R_d = 1 + h$$

We obtain:

$$(1+h)^\kappa > 1 + h\kappa \quad (10)$$

which is exactly the famous inequality of Bernoulli.

We conclude:

$$\eta_{Ro} > \eta_D \quad (11).$$

I claim:

1. An ignition system for spark-ignited internal combustion engines operating with Diesel fuel at a compression ratio in the range of about 17.5:1 to 21:1, said internal combustion engines having spark igniting means for the combustion chamber of each cylinder, said ignition system comprising:
   a. an intake manifold,
   b. an exhaust manifold extending at least in part through said intake manifold,
   c. said exhaust manifold being heated, in normal operation of the engine, to a Diesel fuel vaporizing temperature, and
   d. at least one fuel injector for injecting Diesel fuel into the combustion chamber of each engine cylinder,
   e. said fuel injector being positioned to direct the fuel upon a portion of the part of the exhaust manifold that extends through the intake manifold,
   f. whereby the exhaust manifold heat vaporizes the Diesel fuel before it enters the combustion chamber.

2. An ignition system in accordance with claim 1, wherein:
   a. a glow plug is provided in the intake manifold for each cylinder,
   b. said glow plug being adapted to heat the Diesel fuel when the exhaust manifold heat is insufficient to vaporize the Diesel fuel.

3. An ignition system in accordance with claim 1, wherein:
   a. said engine has more than one fuel injector,
   b. said fuel injectors being directed against opposite sides of the exhaust manifold,
   c. whereby the cooling effect of the Diesel fuel upon the exhaust manifold is distributed between the opposite sides of the exhaust manifold to reduce the cooling of each side.

4. An ignition system in accordance with claim 3, wherein:
   a. the two fuel injectors operate alternately,
   b. thereby further reducing the cooling effect of the Diesel fuel upon each side of the exhaust manifold.

5. An ignition system in accordance with claim 1, wherein:
   a. each fuel injector is placed in line with an air intake in said intake manifold.

6. An ignition system in accordance with claim 1, wherein:
   a. the cross-section of said intake manifold is reduced in area toward the inlet port of each cylinder,
   b. whereby turbulence is induced to homogenize the air-fuel mixture.

* * * * *